Aug. 25, 1953 J. C. WIESE 2,649,837
STEREOSCOPIC VIEWER
Filed July 3, 1951 2 Sheets-Sheet 1

INVENTOR.
JESSE C. WIESE
BY
Fulwider and Mattingly
ATTORNEYS.

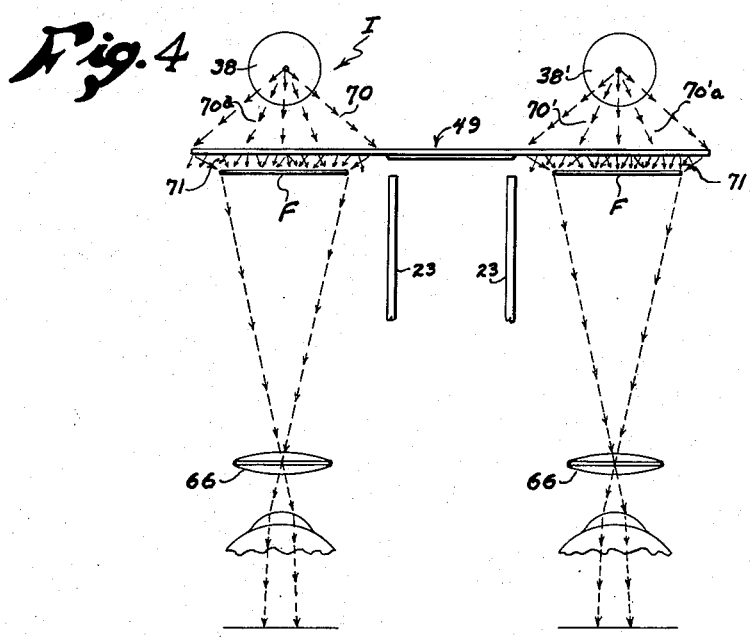
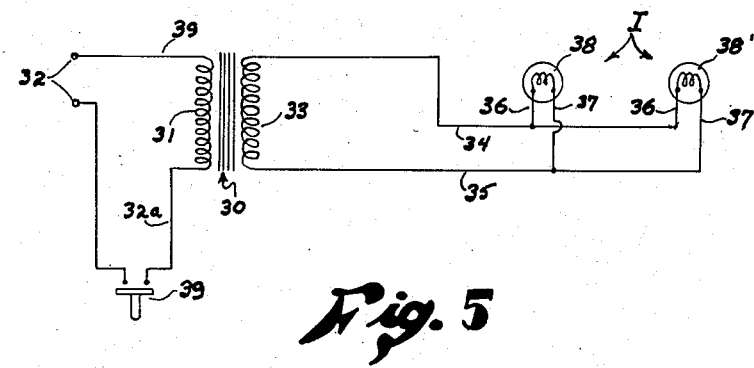

Patented Aug. 25, 1953

2,649,837

UNITED STATES PATENT OFFICE 2,649,837

STEREOSCOPIC VIEWER

Jesse C. Wiese, San Pedro, Calif.

Application July 3, 1951, Serial No. 235,067

4 Claims. (Cl. 88—29)

The present invention relates to the field or stereoscopic viewers, and more particularly to an improved viewer which may be used with stereoscopic film to produce an image of the photographed object that is of constant definition and coloration over a prolonged period of time.

The ability of an observer to appreciate distance and the three-dimensional properties of objects depends upon a phenomenon known as stereoscopic vision. This is psychological or physiological in origin, and depends on the ability of the brain to fuse the two images formed on the individual retinas. The two eyes view any object from slightly different angles, and the two different retinal images are combined to give a sensation of shape or form. Stereoscopic vision cannot be accomplished with a single unaided eye.

The production of stereoscopic film is simply carrying out photographically the equivalent operation performed visually by the eyes. Thus, a stereoscopic film is a permanent record in the form of two laterally spaced pictures of the same object that have been taken at slightly different angles, and when viewed concurrently, result in the formation of a three-dimensional image that approximates the true appearance of the photographed object.

A stereoscopic picture is used in order to secure a permanent reproduction of a particular object, and in this reproduction depict the closest approximation to the natural color and configuration of the object as possible.

The production of a three-dimensional image from a stereoscopic film that accurately depicts the definition and coloration of the photographed object is dependent on the degree of cooperation effected between the film and light source in the viewer. Thus, as the colored stereoscopic film is normally taken in strong colorless light, the true coloration of the film can only be attained when it is viewed against a similar colorless illuminated background.

The primary purpose in devising the present invention is to provide a stereoscopic viewer that permits films to be observed against a blanket of colorless light of uniform intensity, irrespective of the length of time involved, with the source of light provided by means that will not cause the viewer to become so heated as to be uncomfortable to handle or damage the film under inspection.

A major object of the invention is to provide a stereoscopic viewer that operates from a domestic source of electrical energy to provide a colorless blanket of light of constant intensity against which stereoscopic films may be viewed.

Another object of the invention is to provide a portable compact stereoscopic viewer which has low voltage illuminating means and a domestic electrical power reducing transformer positioned within the confines of the device, that permit it to be operated over long periods of time with no variation in the intensity of light used for viewing purposes.

A further object of the invention is to provide a viewer that completely eliminates the use of batteries, and thus avoids the yellow coloration imparted to the viewing light as the batteries are depleted.

Yet another object of the invention is to furnish a stereoscopic viewer that is shockproof, and may be safely used by either children or adults.

A still further object of the invention is to furnish a stereoscopic viewer that is no more complicated to manufacture than presently available devices used for this purpose, can be fabricated from standard commercially available material, and may be retailed in the medium priced merchandising field to encourage the use of stereoscopic photographs.

These and other objects and advantages of the invention will become apparent from the following description of a preferred form thereof, and from the drawings illustrating that form in which:

Figure 4 is a diagrammatic plan view of the device illustrating the operation thereof; and Figure 5 is a diagrammatic view of the electrical wiring used in the device.

Figure 1:
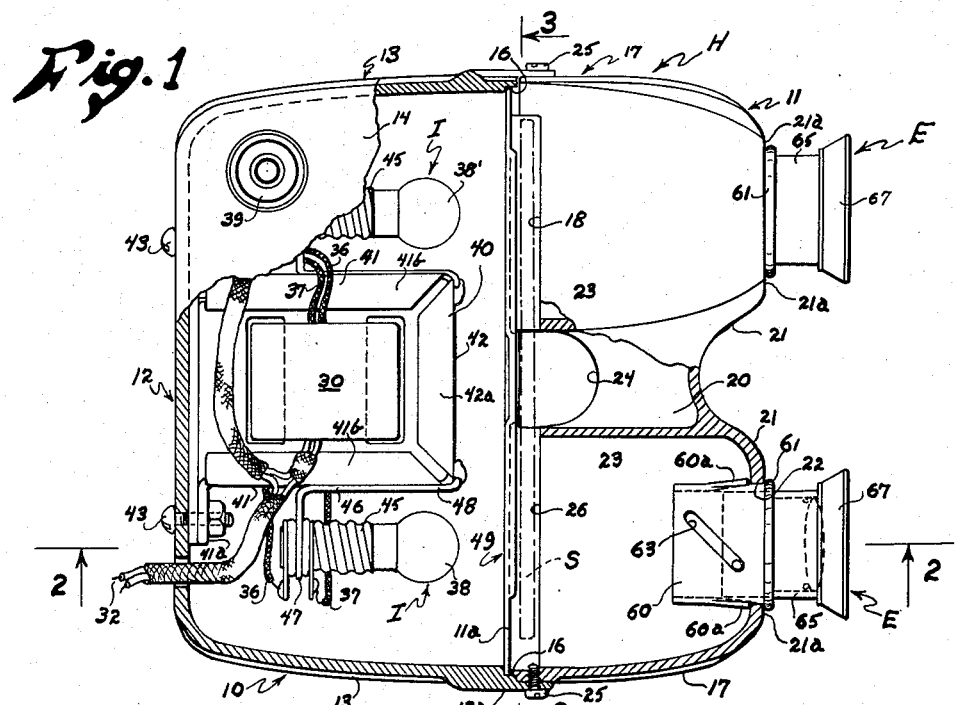
Figure 1 is a combined plan and horizontal cross-sectional view of the present invention.
Figure 2:
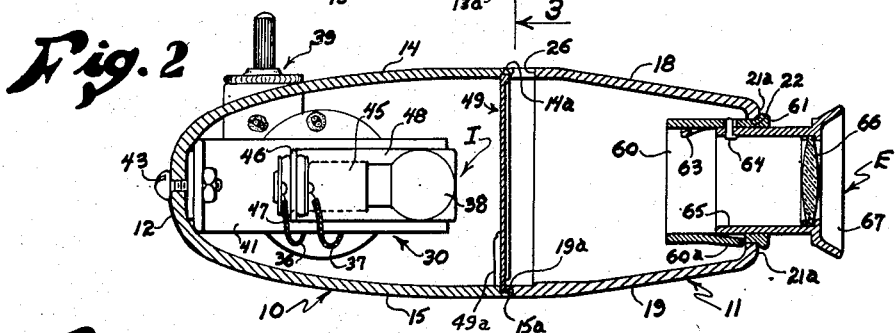
Figure 2 is a vertical cross-sectional view of the device taken on line 2—2 of Figure 1.
Figure 3:
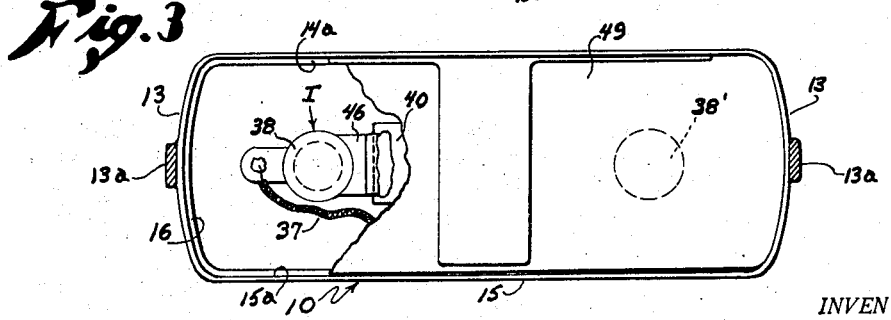
Figure 3 is a vertical cross-sectional view of the present invention taken on line 3—3 of Figure 1.

Referring now to Figures 1 and 2 for the general arrangement of the invention, it will be seen that it includes an elongated housing H comprising a rearwardly and forwardly disposed housing portions 10 and 11 respectively, each of which has an open end portion abutting one another along a transversely extending junction line 11a. Illuminating means I is positioned within the confines of housing portion 10 and two laterally spaced eye pieces E are mounted in the forward portion of housing portion 11.

Housing portion 10 may be fabricated from any light-weight, rigid opaque material, but for convenience and economy of manufacture it is preferably molded as an integral unit from a suitable plastic material. The housing portion 10 comprises a rearward wall member 12 from which two identical slightly convex side walls 13 extend forwardly. Side walls 13 develop along their longitudinal edges into an upper wall member 14 and a lower wall member 15 that are likewise slightly convex, and extend forwardly from the rearward wall member 12.

Each of the side walls 13 has an outer longitudinally positioned section 13a of somewhat greater thickness than the balance of the side wall, with each section 13a and side wall 13 having a vertically positioned recess 16 formed on the forward portion thereof. Lower wall member 15 has a recess 15a extending along the forwardly positioned edge thereof.

Housing portion 11 comprises two slightly curved laterally spaced side walls 17 that are connected by an upper wall member 18 and a lower wall member 19. Wall members 18 and 19 each have a centrally disposed recess 20 formed therein, with the forward edges of the recessed portion developing into a curved side wall 21. Side wall 21 continues outwardly on each side thereof into a side wall 21a that joins wall members 18 and 19 and one of the side walls 17. The eye pieces E are mounted in openings 22 provided for that purpose in the side walls 21a. Two laterally spaced, longitudinally extending baffles 23 are disposed within the confines of housing portion 11, and are situated on each side of a centrally located opening 24 that extends forwardly from the rearward edge of wall member 19.

The rearwardly disposed edge portions of side walls 17 seat in recesses 16, and are removably held in position therein to join housing portions 10 and 11 by screws 25 that engage tapped bores formed in both side walls 17 and side wall sections 13a. Lower side wall 19 has a rearwardly projecting lip 19a that seats in recess 15a when housing portions 10 and 11 are joined as above described. A centrally disposed transversely positioned slot 26 is formed on the rearward edge portion of member 18 of sufficient length to permit a holder S for stereoscopic film to be slidably inserted within the confines of the housing H for viewing purposes. The holder S may be removed from slot 26 by inserting a finger in opening 24 to engage the holder and slide it upwardly.

A small transformer 30 of rectangular shape is provided that has a primary 31 connected by insulated conductors 32 to a source of domestic electrical energy. The transformer 30 has a secondary 33 which supplies low voltage electrical power (5 volts has been found quite satisfactory) through two conductors 34 and 35. Conductors 34 and 35 have branches 36 and 37 in parallel to two identical flashlight bulbs 38 and 38'. An electrical rotary type snap switch 39 is mounted in a convenient position on the viewer as shown in Figure 1, and is connected to conductors 32 and to the primary of transformer 30 by a conductor 32a.

Transformer 30 (Figure 1) is supported within the confines of rearward housing portion 10 in a longitudinally extending position by a bracket 40. Bracket 40 is preferably fabricated from a strip of rigid material that is bent into the shape of a square U which has two parallel legs 41 and a connecting web 42. The free ends of legs 41 are bent outwardly into tabs 41a that seat against the interior face of wall member 12.

The two longitudinal edge portions of the legs 41 and web 42 are bent inwardly to form flanges 41b and 42a respectively. Transformer 30 is slipped within the confines of bracket 40, and tabs 41a are affixed by screws 43 or other suitable fastening means to wall member 12. In this manner transformer 30 is supported between wall member 12 and bracket 40 and cannot move vertically relative to the bracket due to the inwardly extending flanges 41b and 42a.

The electrical bulbs 38 and 38' are each held in identical longitudinally positioned sockets 45 disposed on opposite sides of transformer 30. Each of the sockets 45 is mounted on an L-shaped bracket 46 that has one leg 47 which engages the socket, and another leg 48 rigidly affixed to the exterior surface of one of the transformer bracket supporting legs 41. Light from bulbs 38 and 38' is projected forwardly toward the eye pieces E, but fall on a continuous strip 49 of a light diffusing material such as frosted or opalite glass mounted in the forward edge portion of housing portion 10. The bottom edge of strip 49 is situated in recess 15a, the side edges in recesses 16, and the upper edge in a recess 14a formed in wall member 14.

Movement of strip 49 is prevented when housing portions 10 and 11 are in engagement, as the rearward edge portions of the strip is in contact with body shoulders 14b, 15b and 16a formed by recesses 14a, 15a and 16 respectively. The forward edge portions of the strip are engaged by the rearwardly projecting portions of housing 11 that engage recesses 15a and 16.

Eye pieces E are identical in construction, and comprise a tube 60 that extends through one of the openings 22. Tubes 60 each have a ring 61 formed on the forward end thereof that seats on the exterior surface of side wall 21a. A longitudinally extending segment 60a of each tube 60 is bent outwardly to position the forward end thereof against the interior face of side wall 21a. Each tube 60 is thus held in a non-movable position as ring 61 and segment 60a grip a portion of side wall 21a therebetween.

Each of the tubes 60 has a diagonally positioned slot 63 formed therein that is slidably engaged by a pin 64. Pin 64 is rigidly mounted on the exterior surface of a second tube 65 which is rotatably supported in tube 60. Tube 65 has a magnifying lens 66 positioned within the confines thereof which terminates in a suitable annular eye piece 67 as may be seen in Figures 1 and 2. When one of the tubes 65 is rotated it is moved longitudinally in tube 60 due to the travel of pin 64 within the confines of the fixed slot 63.

The use and operation of the invention is extremely simple. Conductors 32 are connected to a source of domestic electric power, and switch 39 placed in the closed position to energize transformer 30. Transformer 30 supplies unvarying low voltage electrical power to bulbs 38 and 38', projecting two beams of colorless light 70 and 70' of constant intensity onto the diffusion strip 49.

In Figure 4 it will be noted that the outer light beams 70 and 70' and the intermediately positioned beams 70a are broken into a number of rays 71 as they pass through strip 49 that are directed through the entire 180 degree angle on the forward face of plate 49. The advantage of a continuous diffusion plate 49 is that it permits uniform illumination of the edge portions of films F, which is prevented when windows of a light-diffusing material of substantially the same dimensions as the films are positioned between them and the source of light, as is done with presently available equipment.

The use of a constant undiminishing source of electrical energy to illuminate bulbs 38 and 38' provides the distinct advantage that a source of colorless light is provided that in no way alters or accentuates the various colors of the films under observation. With present day viewers, the light assumes a yellowish cast as the electrical output of the batteries diminishes in strength, with the colored light so produced altering the appearance of the films from that seen when they are observed against a colorless blanket of light.

Although the yellow coloration of the illumination created when the batteries run down is a serious disadvantage in present day viewers, an equally serious disadvantage is the loss of detail suffered due to the decrease in light intensity. Both of these disadvantages are eliminated in the present invention.

The present invention has longitudinally adjustable magnifying eye pieces E that allow for adjustment of each eye piece to correct any discrepancies in individual visual capacity, and as a result provide a stereoscopic image of maximum definition for each user.

Although the above described form of the invention has been found to operate satisfactorily in providing a colorless blanket of light of uniform intensity on diffusion plate 49, the following variation in the structure of plate 49 may be provided if desired.

As the primary purpose of the viewer is to provide a uniform blanket of colorless light against which the films in holder F may be observed, plate 49 may have a coating 49a of a fluorescent salt such as one of the silicates, tungstates or borates that exhibits this phenomena when exposed to visible and invisible light from the bulbs 38 and 38' coated on one side thereof as a continuous layer. When actuated by light from bulbs 38 and 38', coating 49a presents a blanket of light of absolutely uniform intensity for film viewing purposes. It will be apparent that the use of coating 49a increases the efficiency of bulbs 38 and 38' by utilizing both the visible and invisible radiations emitted therefrom.

The above described stereoscopic viewer has been found from experience to operate quite satisfactorily, but applicant wishes it clearly understood that the invention is not to be limited to the details of construction and design herein shown and described other than as defined by the appended claims.

The invention claimed is:

1. In a stereoscopic viewer, the combination of: a housing having an opening formed therein in which a stereoscopic film holder may be inserted for viewing purposes, two laterally spaced eye pieces mounted in one end of said housing, a light diffusion plate mounted in said housing and disposed on the side of said opening opposite to that side of the housing in which said eye pieces are mounted, a fluorescent coating mounted on one side of said plate, and domestic power actuated means that excite said coating to emit a uniform blanket of light against which the films in said holder may be viewed.

2. In a stereoscopic viewer, the combination of: a housing having an opening formed therein in which a stereoscopic film holder may be inserted for viewing purposes, two laterally spaced eye pieces mounted in one end of said housing, a light transmitting plate coated on one side with a fluorescent material disposed in said housing on the side of said opening opposite to that side of the housing in which said eye pieces are mounted, low voltage incandescent bulb means mounted in said housing in the end thereof opposite that in which said eye pieces are mounted, and disposed to project light onto said plate, and means to reduce the voltage of a domestic electric power supply to a low voltage to energize said bulb means and cause said plate to be illuminated with uniform intensity due to the fluorescence of said material.

3. In a stereoscopic viewer, the combination of: a housing having an opening formed therein in which a stereoscopic film holder may be inserted for viewing purposes, two laterally spaced eye pieces mounted in one end of said housing, a light transmitting plate coated on one side with a fluorescent material disposed in said housing on the side of said opening opposite to that side of the housing in which said eye pieces are mounted, low voltage incandescent bulb means mounted in said housing in the end thereof opposite that in which said eye pieces are mounted, and disposed to project light onto said plate, and a transformer positioned in said housing that reduces the voltage of a domestic electric power supply to a low voltage to energize said bulb means and cause said plate to be illuminated with uniform intensity due to the fluorescence of said material.

4. A stereoscopic viewer that includes: a box-like housing having a transversely disposed slit formed in the top wall thereof in which a slide may be removably inserted; two sockets each capable of holding a low voltage incandescent bulb; two brackets each supporting one of said sockets; a low voltage transformer of substantially rectangular shape, said transformer supporting said brackets in spaced relationship on opposite sides thereof, and having insulated electrical conductors extending to said sockets to supply low voltage electric power to incandescent bulbs that may be mounted therein; bracket means that rigidly support said transformer, brackets and sockets as an integral unit within the rearward confines of said housing; a diffusion plate transversely disposed within the confines of said housing rearwardly from said slot, with said plate having two light transmitting areas of greater width than that of the pictures on a slide which is inserted into said housing through said slot; a pair of lenses mounted in the forward wall of said housing; a second insulated electrical conductor extending from said transformer to the exterior of said housing through an opening formed in the rearward portion thereof, said conductor adapted for connection to a domestic source of electricity; and an electrical switch mounted on said housing that controls the flow of electrical power in said second conductor, with said switch so disposed on said housing as not to be actuated when said housing is supported on the bottom side wall thereof.

JESSE C. WIESE.

References Cited in the file of this patent
UNITED STATES PATENTS

| Number | Name | Date |
|---|---|---|
| 2,152,353 | Lewin | Mar. 28, 1939 |
| 2,349,013 | Sparling | May 16, 1944 |
| 2,377,109 | Schwartz et al. | May 29, 1945 |
| 2,475,798 | Monson | July 12, 1949 |